Sept. 22, 1942.    W. H. MARCHANT    2,296,390
PROCESS FURNACE
Filed Feb. 28, 1940    2 Sheets-Sheet 1

INVENTOR
WILLIAM H. MARCHANT
BY
James M. Abbott
ATTORNEY

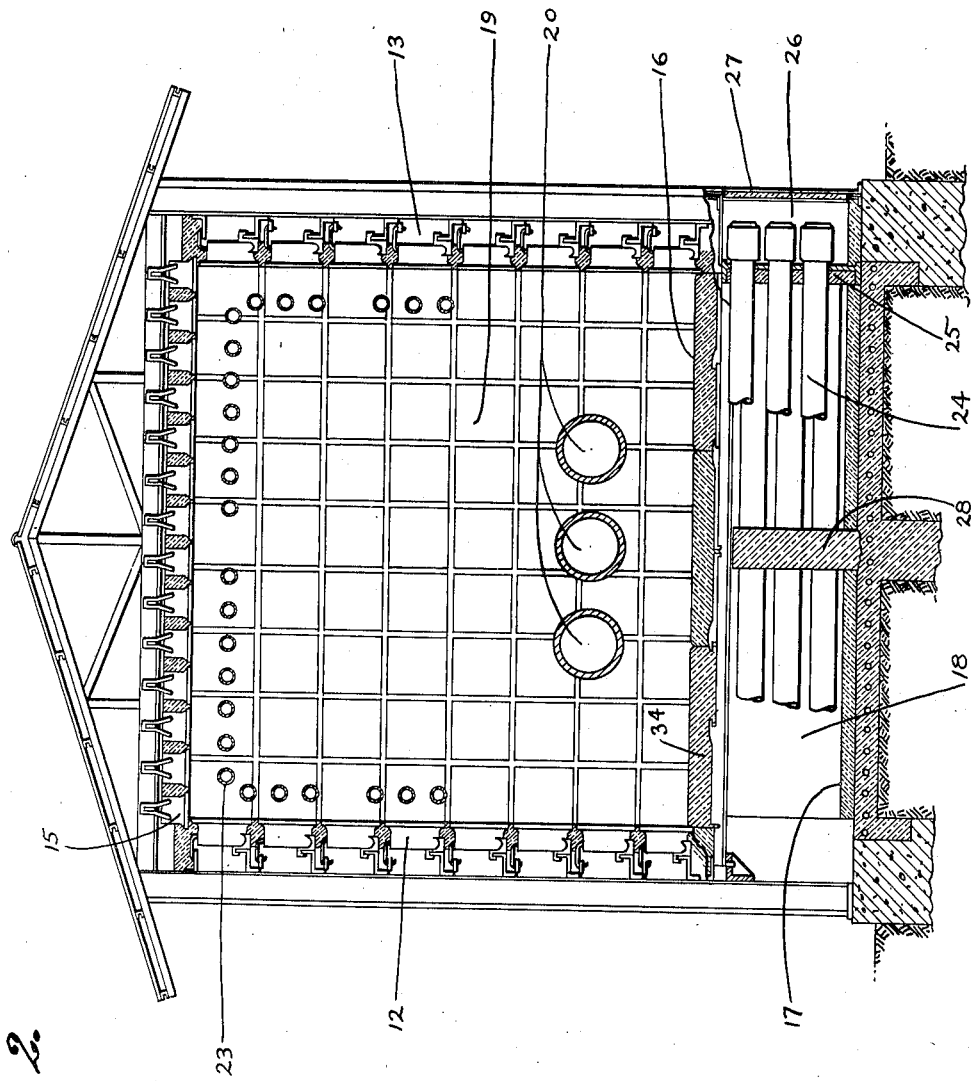

Patented Sept. 22, 1942

2,296,390

UNITED STATES PATENT OFFICE 2,296,390

PROCESS FURNACE

William H. Marchant, South Pasadena, Calif.

Application February 28, 1940, Serial No. 321,277

4 Claims. (Cl. 122—356)

This invention pertains to a process furnace, as for example such as used in processing oils, gases and processed liquids or fluids.

In oil refining apparatus, for example, it is usual to use a type of furnace for heating the oil commonly known as a pipe still. One of the preferable forms of this type of furnace embodies a structure within which oil may be heated by radiation and by convection, thus utilizing a maximum heat transfer between the heat source and the oil in the tubes of the two sections of the furnace. In most structures of this particular type the bank of convection tubes is located at a point of considerable elevation. This makes it difficult to clean the tubes or to change them since scaffolding must be erected in order that workmen can conveniently carry on repairs at a considerable elevation above the ground. In these various stills it is also a problem to maintain a suitable foundation beneath the still since the continuous heat of the furnace will act in certain soil conditions to dry out the soil and cause it to become unstable as a support. It is also a principal object in constructing pipe stills to attempt to attain the greatest amount of heat transfer possible. It is the principal object of the present invention, therefore, to provide a furnace at reduced cost and of the type described which has been designed to place the convection section of the furnace beneath the floor thereof and in the path of travel of the products of combustion to the flue of the furnace, whereby the tubes in the convection section may be easily reached and readily withdrawn or interchanged, and furthermore whereby a maximum heat transfer between the flue gases and the tubes will take place in the area beneath the floor of the furnace, thus insuring that a relatively small amount of heat will radiate to the ground beneath the furnace.

The present invention contemplates the provision of a furnace having a radiant furnace section in connection with which heat is generated or introduced into a furnace and in the presence of a bank of radiant tubes and after which the products of combustion pass into a convection section of the furnace located beneath the floor of the radiant section where a bank of convection tubes is placed in the path of the gases flowing from the furnace to the stack.

The invention is illustrated by way of example in the accompanying drawings, in which:

Fig. 2 is a view in transverse section through the furnace as seen on the line 2—2 of Fig. 1, showing other details of the invention.

Figure 1:
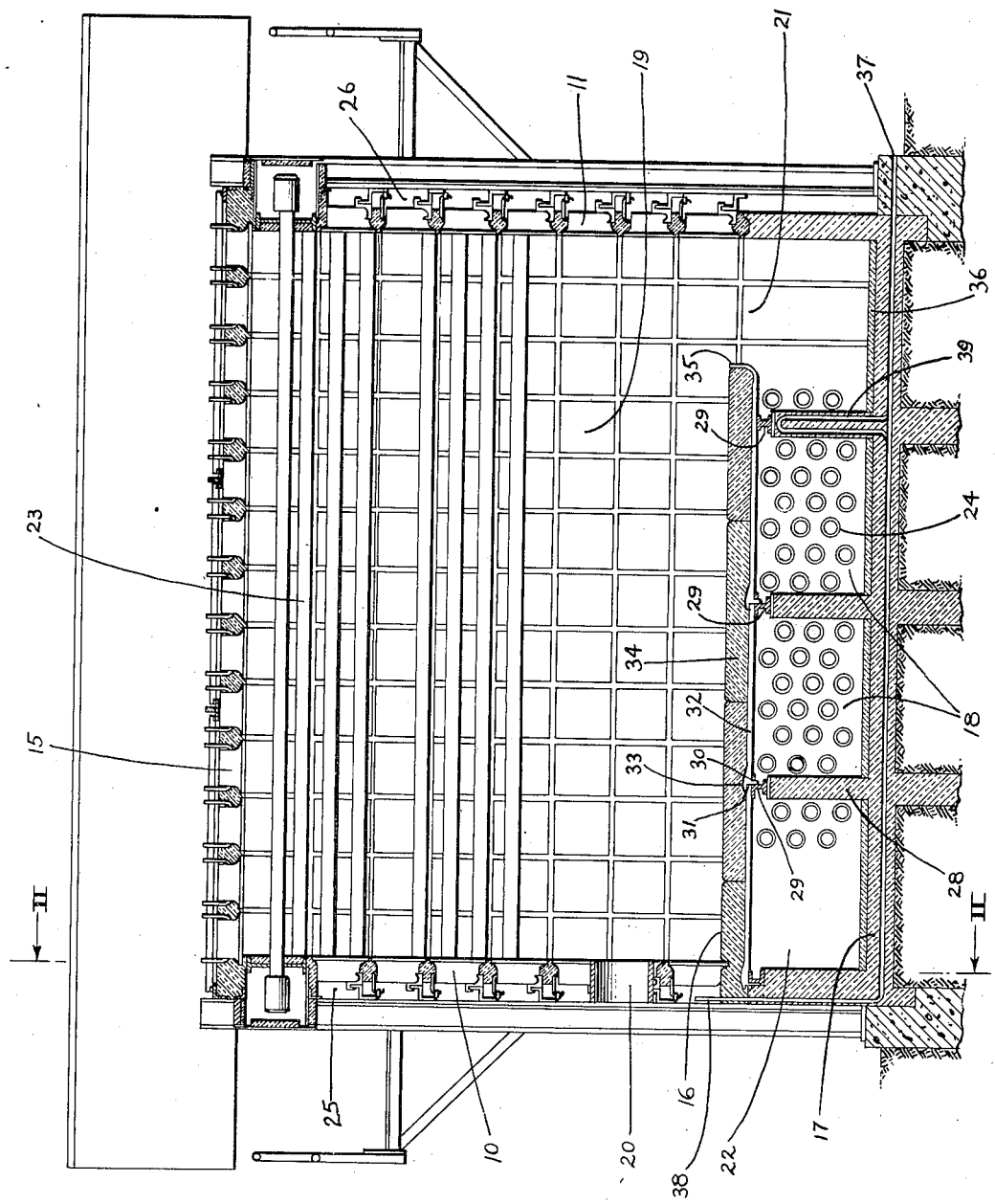
Figure 1 is a view in central vertical section through the furnace showing the arrangement of the radiant and convection sections.

Referring more particularly to the drawings, 10 and 11 indicate vertical end walls of a type of furnace with which the present invention is concerned. Side walls 12 and 13 are also provided, and a ceiling 15 may be supported thereby. These walls are made of heat-resistant material. Extending horizontally within the furnace is an elevated floor 16. This is spaced vertically from a sub-floor 17 and forms a convection section 18. The space within the furnace between the elevated floor and the ceiling 15 forms the radiant section 19.

In the end wall 10 burner openings 20 are formed so that suitable burners may be mounted therein and will produce a desired combustion of fuel within the furnace. At the opposite end of the convection section from the throat 21 is a duct 22 leading to the furnace stack. Thus, it will be seen that the furnace here disclosed is a down draft furnace and that its convection section is disposed beneath the floor and in a path of travel of the combustion gas to the stack. Mounted in the top of the radiant section is a bank of oil circulating tubes 23. These are here shown as extending horizontally from the wall 10 to the wall 11 and as being disposed parallel to the ceiling 15 and the side walls 12 and 13 and adjacent thereto.

Mounted within the convection section 18 and disposed at right angles to the path of flow of the combustion gases to the stack is a set of oil circulating tubes 24. These tubes are supported at their opposite ends in wall structures 25 and 26 through which the convection tubes 24 extend. The ends of these tubes terminate within a space 26 beneath the walls of the furnace, which space at times may be closed temporarily by removable panels or doors 27. When these panels are removed access may be had to all of the tubes 24 in the convection section. It will also be noted that the panels 27 when used are above ground, making it possible for workmen to gain access readily to the tubes to withdraw or interchange them.

The banks of tubes may be disposed in any desirable relation to each other or to the furnace. The elevated floor is supported upon piers 28 which rise from the sub-floor 17 and terminate a desired distance below the elevated floor. These piers may be constructed of the same or different material from the remainder of the furnace. Resting upon these piers are structural iron elements 29 of structural section. Openings 30 are formed through the upper leg of the section and receive a locking lug 31 carried by floor plates 32. These locking lugs 31 are disposed at one end of the floor plates only so that the other end while resting upon the next adjacent structural element will be free to move laterally as it expands and contracts. The end of the floor plates carrying the lugs is formed with an overhanging lip 33 which lies over the next adjacent floor plate and forms an expansion joint therewith.

Supported upon the floor plates 32 is a thickness of fire-resistant material, as indicated at 34. In order to prevent this material from objectionably deteriorating or disintegrating due to its expansion and contraction it is preferable to make the layer of material in blocks or sections, and as here shown the joints between the sections are broken and preferably occur between the joints in the sections of the floor plates 32. The floor plate 32 which occurs at the end of the floor adjacent the throat 21 may be formed with an up-turned lip 35 which forms a limiting element for the layer of fire-resistant material 34. It is desirable to apply a layer of heat insulating material 36 to the sub-floor 17 so that the heat lost by radiation will be minimized. This will prevent penetration of heat into the ground beneath the sub-floor with the attendant detrimental results. It may be desirable to also provide means for cooling the sub-floor and the piers and at the same time supplying hot air to support combustion of fuel in the burners. This may be done by laying or forming air tubes 37 in the sub-floor to extend the full length thereof and to terminate in an up-turned portion 38 leading to the burner openings 20. Other expedients for creating suitable air circulation may be provided if desired. The piers 28 may also be formed with air ducts 39 in communication with the ducts 37.

In operation of the invention the furnace is assembled as here shown, after which it is fired. The heat produced by the burner will be imparted to the tubes 23 substantially by radiation. The products of combustion will flow horizontally over the elevated floor 16 and then will pass downwardly through the throat 21 and into the convection section 18 where it will encounter the tubes 24, after which the combustion gases will flow through the ducts 22 and into the stack (not shown in the drawings). It is to be understood that the elevated floor 16 may be made of heat insulating material or non-insulated material in order to meet the heat transfer requirements of the apparatus, and that this floor acts to guide or direct the heated air across the radiant section of the furnace and then in a counter-flow beneath the floor and through the convection section of the furnace. The rate of heat exchange in the convection section of the furnace will depend upon the cross-sectional area of the convection section and the obstruction therein to the flow of the gases, whereby the velocity will be determined. It will be seen that the presence of the convection chamber below the main floor of the radiant section will act to insure a minimum heat loss through the sub-floor and the ground therebeneath and will reduce the cost of the material and labor used in construction of the furnace, since objectionable and expensive pipe supports will be eliminated and in the designs here shown one wall will be eliminated which is normally used to define the convection section. It is also to be pointed out that by the arrangement here shown a lesser number of heat transfer tubes are required since a greater amount of heat is absorbed without waste. In addition to these features it will be noted that since the convection bank of tubes is disposed at ground level they may be easily serviced, resulting in the use of less labor and greater safety to the workmen.

It is to be understood that while the invention is here shown as embodied in a furnace structure for processing oil that the same invention may be used in connection with various other types of apparatus.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. In a furnace of the type described which includes an outer wall forming a furnace chamber and within the upper portion of which are radiantly heated tubes and in the lower portion of which are convectively heated tubes, a horizontal partition separating said sets of tubes, said partition comprising a plurality of separate interengaging shield plates freely supporting a separate layer of fire resistant material, whereby the partition will protect the convection tubes from the extreme heat to which the radiation tubes are subjected.

2. In a furnace of the type described which includes an outer wall forming a furnace chamber and within the upper portion of which are radiantly heated tubes and in the lower portion of which are convectively heated tubes, a horizontal partition separating said sets of tubes, said partition comprising a plurality of separately movable interengaging shield plates supporting a separate layer of fire resistant material, whereby the partition will protect the convection tubes from the extreme heat to which the radiation tubes are subjected, and supporting means for said partition permitting expansion and contraction of the partition.

3. In a furnace of the type described which includes an outer wall forming a furnace chamber and within the upper portion of which are radiantly heated tubes and in the lower portion of which are convectively heated tubes, supporting piers, a horizontal partition wall resting upon said piers and dividing the radiant tube section from the convection tube section, said horizontal partition wall including separate metal floor plates fixed upon said piers at one edge and adapted to have relative movement with each other, and a plurality of separate heat resistant slabs freely resting upon said plates and substantially covering the same.

4. In a furnace of the type described which includes an outer wall forming a furnace chamber and within the upper portion of which are radiantly heated tubes and in the lower portion of which are convectively heated tubes, supporting piers, a horizontal partition wall resting upon said piers and dividing the radiant tube section from the convection tube section, said horizontal partition wall including separate metal floor plates fixed upon said piers at one edge and overlapping each other and adapted to have relative movement with each other, and a plurality of separate heat resistant slabs mounted upon said plates and substantially covering the same.

WILLIAM H. MARCHANT.